(No Model.)

G. C. HATCH.
HARVESTER CUTTER.

No. 354,786. Patented Dec. 21, 1886.

Witnesses_
H. J. Ferguson,
C. E. Ruggles.

Inventor:
George C. Hatch
By A. M. Wooster
Atty.

UNITED STATES PATENT OFFICE.

GEORGE C. HATCH, OF BRIDGEPORT, CONNECTICUT.

HARVESTER-CUTTER.

SPECIFICATION forming part of Letters Patent No. 354,786, dated December 21, 1886.

Application filed July 15, 1886. Serial No. 208,062. (No model.)

*To all whom it may concern:*

Be it known that I, GEORGE C. HATCH, a citizen of the United States, residing at Bridgeport, in the county of Fairfield and State of Connecticut, have invented certain new and useful Improvements in Harvester-Cutters; and I do hereby declare the following to be a full, clear, and exact description of the invention, such as will enable others skilled in the art to which it appertains to make and use the same.

My invention relates to the class of harvester-cutters which are adapted to be attached to reciprocating bars in mowers and reapers, and has for its object to strengthen their construction and greatly improve their cutting qualities without adding to the cost of manufacture.

The cutters in use heretofore have been found not to fully meet the requirements of the various classes of work which they are required to perform. The most serious objections have been that as soon as the edges became dull, which quickly occurs in use, the grass was crowded forward and pushed out from between the cutters and the fingers, so that the machine passed over, leaving a portion of it uncut, or else, where the cutters had prominent projections, they were apt to clog, so that tufts of grass were pulled up by the roots, and the machine was frequently stopped or broken.

I will now proceed to describe my invention in connection with the accompanying drawings, forming part of this specification, in which—

Figure 1:
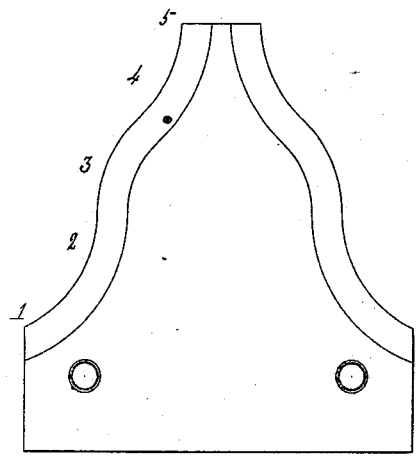
Figure 2:
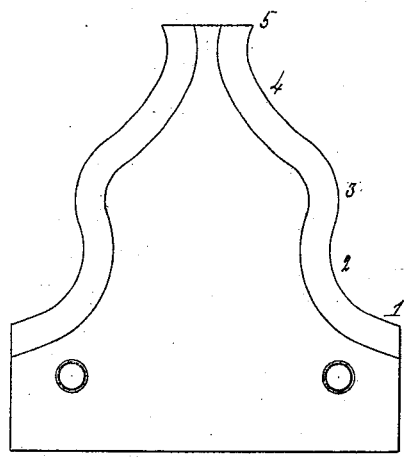

Figures 1 and 2 are views of my improved cutter, the only difference being that the inward curves of the cutting-edges are made somewhat deeper in one form than in the other.

In practice I preferably use the form illustrated in Fig. 2.

The essential principle of my invention is that the lines of the cutting-edges are curved and recurved, avoiding, on the one hand, all straight edges, and, on the other hand, all prominent projections.

Starting from the point indicated by 1—that is, the lower extremity of the cutting-edge near the cutter-bar—the edge curves inward to the point indicated by 2, then outward to the point indicated by 3, point 3 being, in fact, a rounded shoulder, which may be made more or less prominent, as indicated in Figs. 1 and 2. At point or shoulder 3 the edge recurves and tends inward again to the point indicated by 4. From point 4 I preferably curve the edge outward slightly to its extreme outer end, (indicated at 5 in Fig. 2,) although in practice I have obtained perfectly satisfactory results by lengthening the curves somewhat, as indicated in Fig. 1.

The results of my improved construction may be briefly stated as follows: By widening the cutters at the central portion thereof—that is, in a straight line across the cutter between shoulders 3—I greatly increase the strength of the cutters at just the point where the greatest strain comes in use, and where, of course, most strength is required. By widening the space between the cutting-edges at the bases of the cutters I prevent clogging at [that portion. By giving the cutters a slight outward curve, as in Fig. 2, so that shoulder 3 will reach the finger slightly before point 2, I provide that all of the grass caught between the cutters and fingers below shoulder 3 shall be severed, instead of being crowded forward, as has heretofore been the case; and, on the other hand, by avoiding a hooked or prominent projection at point 3, I prevent the possibility of clogging below that point, as has been the case in other styles of cutters. As I have found this peculiar construction to work so well in the lower half of the cutter, I practically duplicate it in the upper half. As stated above, I have found both forms illustrated to work with perfect success.

The exact lines of the curves I do not consider essential features of my invention, it being simply necessary that the outward curve from point 4 to point 5 shall be sufficient to prevent the grass from being pushed forward instead of being severed by the cutter. The exact length also of the different portions of the cutting-edge is not an essential feature of my invention, although I preferably so construct the cutters that shoulder 3 will be approximately half-way between points 1 and 5.

Having thus described my invention, I claim—

1. A harvester-cutter having curved and recurved cutting-edges, the direction of the curve being inward from the base of the blade, then outward to a shoulder midway the length of the cutting-edges, at which point it is recurved and trends inward, then outward again, as and for the purpose set forth.

2. A harvester-cutter whose cutting-edges curve inward from point 1 to point 2, then outward to shoulder 3, then recurve inward to point 4, and outward again to point 5.

3. A harvester-cutter having curved and recurved cutting-edges, each edge being provided with a shoulder, 3, which projects beyond the point 2 of the inward curve of the edge, and the outer ends of the cutting-edges projecting beyond the point 4 of the inward curve of the edge, as and for the purpose set forth.

In testimony whereof I affix my signature in presence of two witnesses.

GEORGE C. HATCH.

Witnesses:
A. M. WOOSTER,
C. E. RUGGLES.